US008070237B2

(12) United States Patent
Ogawa et al.

(10) Patent No.: US 8,070,237 B2
(45) Date of Patent: Dec. 6, 2011

(54) BRAKE CONTROL METHOD AND SYSTEM

(75) Inventors: Takahiro Ogawa, Yokohama (JP); Helge Westerfeld, Yokohama (JP); Markus Hamm, Ismaning (DE)

(73) Assignees: Bosch Corporation, Tokyo (JP), part interest; Bayerische Motoren Werke Aktiengesellschaft, Munich (DE), part interest ( * ) Notice: Subject to any disclaimer, the term of this patent is extended or adjusted under 35 U.S.C. 154(b) by 381 days.

(21) Appl. No.: 12/161,367

(22) PCT Filed: Jan. 24, 2006

(86) PCT No.: PCT/JP2006/301037
§ 371 (c)(1),
(2), (4) Date: Jul. 18, 2008

(87) PCT Pub. No.: WO2007/086103
PCT Pub. Date: Aug. 2, 2007

(65) Prior Publication Data
US 2010/0225158 A1 Sep. 9, 2010

(51) Int. Cl.
*B60T 8/32* (2006.01)
(52) U.S. Cl. ............ 303/9.64; 303/137; 701/70; 701/83
(58) Field of Classification Search ............... 303/9.64, 303/138, 158, 163, 174, 137; 701/70, 71, 701/78, 79, 83
See application file for complete search history.

(56) References Cited

U.S. PATENT DOCUMENTS

| 3,871,713 | A | 3/1975 | Lister |
| 5,116,108 | A | 5/1992 | Sigl et al. |
| 5,261,730 | A | 11/1993 | Steiner et al. |
| 5,324,102 | A | 6/1994 | Roll et al. |
| 5,386,366 | A | 1/1995 | Roll et al. |
| 6,672,437 | B2 | 1/2004 | Beringer |
| 7,302,331 | B2 * | 11/2007 | Meyers et al. ............ 701/71 |
| 7,653,471 | B2 * | 1/2010 | Mattson et al. ........... 701/83 |
| 2007/0185623 | A1 * | 8/2007 | Chen et al. ................ 701/1 |
| 2008/0281487 | A1 * | 11/2008 | Milot ........................ 701/38 |
| 2009/0048753 | A1 * | 2/2009 | Ogawa et al. ............. 701/79 |
| 2009/0055066 | A1 * | 2/2009 | Ono et al. .................. 701/70 |
| 2010/0138122 | A1 * | 6/2010 | Westerfeld et al. ....... 701/70 |
| 2010/0145574 | A1 * | 6/2010 | Mattson et al. ........... 701/38 |

FOREIGN PATENT DOCUMENTS

| JP | 5097085 A | 4/1993 |
| JP | 7242166 A | 9/1995 |
| JP | 2727907 B2 | 3/1998 |
| JP | 200229403 A | 1/2002 |
| JP | 2002029397 A | 1/2002 |
| JP | 3416819 B2 | 6/2003 |

* cited by examiner

*Primary Examiner* — Christopher P Schwartz
(74) *Attorney, Agent, or Firm* — Ronald E. Greigg

(57) ABSTRACT

To predictively determine the occurrence of rear wheel lifting before actual lifting of a rear wheel occurs and enable control of brake force.

Vehicle body deceleration is computed on the basis of wheel velocities obtained by wheel velocity sensors 45 and 46 (S102), and when it is determined that that computed value exceeds a predetermined value K1 (S104), then the pressure of a front wheel cylinder 3 is reduced by a predetermined pressure and held at that reduced pressure (S106), and when it is determined that vehicle body deceleration has fallen below a value that is, for example, lower by a predetermined value α than the predetermined value K1 (S108), then the state of holding of the pressure of the front wheel cylinder 3 is released (S110) and brake control returns to normal brake control.

7 Claims, 6 Drawing Sheets

BRAKE CONTROL METHOD AND SYSTEM

BACKGROUND OF THE INVENTION

1. Field of the Invention

The present invention relates to a two-wheeled motor vehicle brake control method and system and in particular to the improvement of controllability with respect to rear wheel lifting.

2. Description of the Related Art

Conventionally, it has been well known that, in two-wheeled motor vehicles, the larger the ratio between the height of the center of gravity of the vehicle and the inter-axial distance between the front and rear wheels is, the easier it is for the phenomenon of so-called lifting of the rear wheel to occur. Additionally, various coping technologies have been proposed with respect to such rear wheel lifting. For example, in Japanese Patent No. 3,416,819, there is disclosed a technology that detects rear wheel lifting on the basis of various conditions such as vehicle deceleration and a drop in the velocity of the rear wheel and adjusts the brake force of the brake.

Further, as disclosed in JP-A-2002-29403, there is disclosed a technology that enables more rapid detection of rear wheel lifting on the basis of a pseudo vehicle body deceleration.

However, in the aforementioned technologies, although the techniques for determining rear wheel lifting are different, the times when lifting of the rear wheel is determined and a detection signal is obtained in both are basically after actual lifting of the rear wheel has occurred.

Additionally, control of brake force for controlling lifting of the rear wheel is executed after the determination result of rear wheel lifting and after a detection signal has been obtained, so there is the problem that a situation where a temporal delay to a certain extent basically cannot be avoided until the effect of control appears.

Related application serial No. 12/161,370, filed Jul. 18, 2008, currently pending; 12/162,223, filed Jul. 25, 2008, currently pending; 12/162,220, filed Jul. 25, 2008, currently pending; and 12/162,626, filed Jul. 30, 2008, currently pending, are directed to similar subject matter. The '370 application is directed to a two-wheeled motor vehicle brake control method and system which enables a more rapid and reliable securement of safety with respect to rear wheel lifting; the '223 application is directed to a two-wheeled motor vehicle brake control method and system that can reliably control and prevent rear wheel lifting caused by an abrupt brake operation; the '220 application is directed to a two-wheeled motor vehicle brake control method and system that can prevent a so-called no-brake state; and the '626 application is directed to a two-wheeled motor vehicle brake control method and system for securement of high safety with respect to rear wheel lifting by reducing a pressure increase gradient of a wheel cylinder pressure of the front wheel immediately after rear wheel lifting.

SUMMARY OF THE INVENTION

The present invention has been made in view of the above-described situation and provides a brake control method and system that predictively determine the occurrence of rear wheel lifting before actual lifting of a rear wheel occurs and enable control of brake force.

According to a first aspect of the present invention, there is provided a two-wheeled motor vehicle brake control method comprising: determining whether or not the value of a predetermined parameter that has been preselected as an index for predicting the potential for lifting of a rear wheel exceeds a first predetermined value; determining that the potential for lifting of the rear wheel is large when the value of the predetermined parameter exceeds the first predetermined value and controlling generation of brake force; and next determining whether or not the value of the predetermined parameter has fallen below a second predetermined value and, when it is determined that the predetermined parameter has fallen below the second predetermined value, releasing the control of the brake force.

According to a second aspect of the present invention, there is provided a two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, and capable of discharging brake fluid of the front wheel cylinder to a front reservoir as desired, wherein the brake control system is configured to determine whether or not the value of a predetermined parameter that has been preselected as an index for predicting the potential for lifting of a rear wheel exceeds a first predetermined value, determine that the potential for lifting of the rear wheel is large when the value of the predetermined parameter exceeds the first predetermined value and control generation of brake force by the front wheel cylinder, and next determine whether or not the value of the predetermined parameter has fallen below a second predetermined value and, when it is determined that the predetermined parameter has fallen below the second predetermined value, release the control of the brake force.

BRIEF DESCRIPTION

Figure 1:
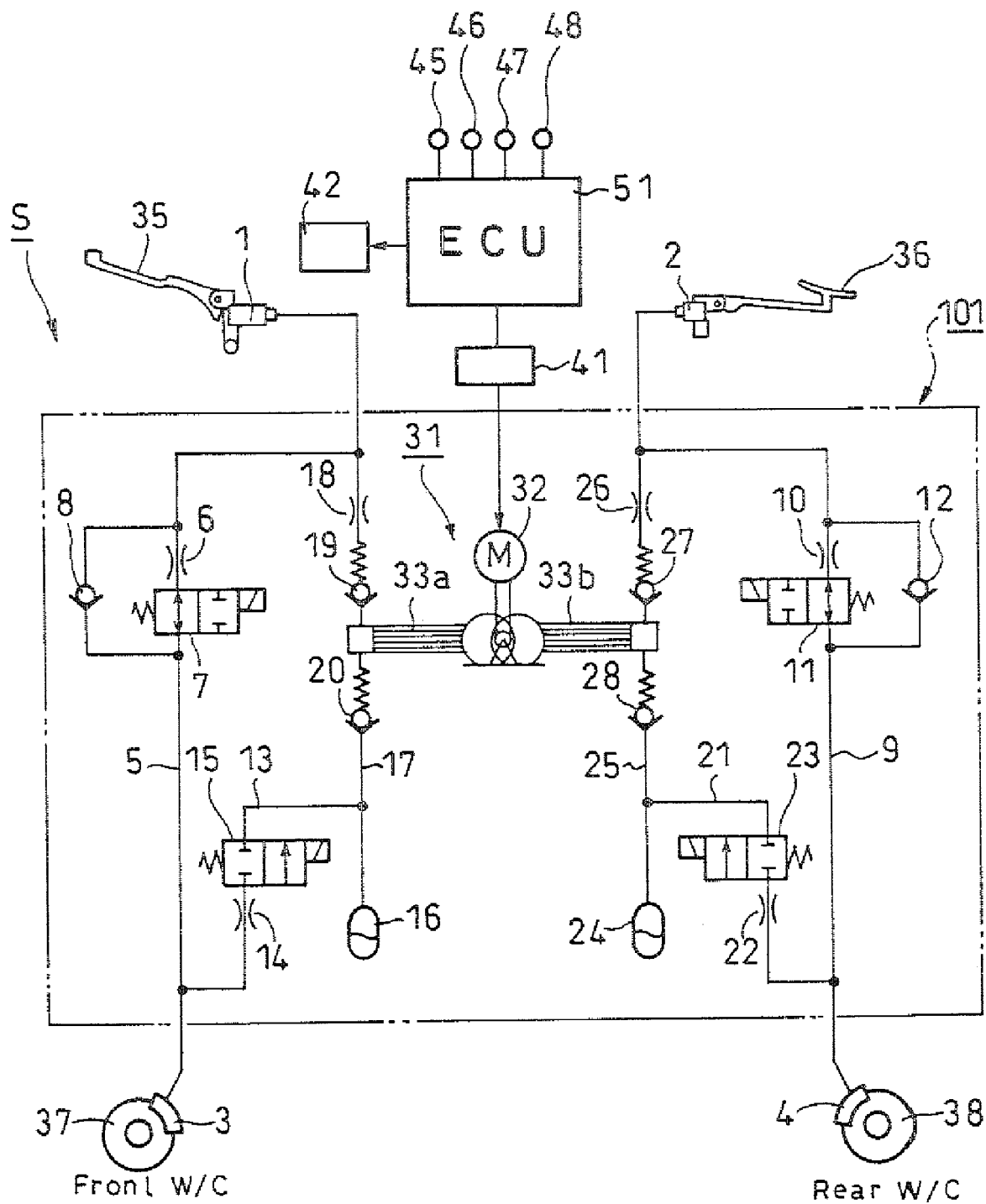
FIG. 1 is a configural diagram showing an example of the configuration of a two-wheeled motor vehicle brake control system in an embodiment of the present invention.
Figure 2:
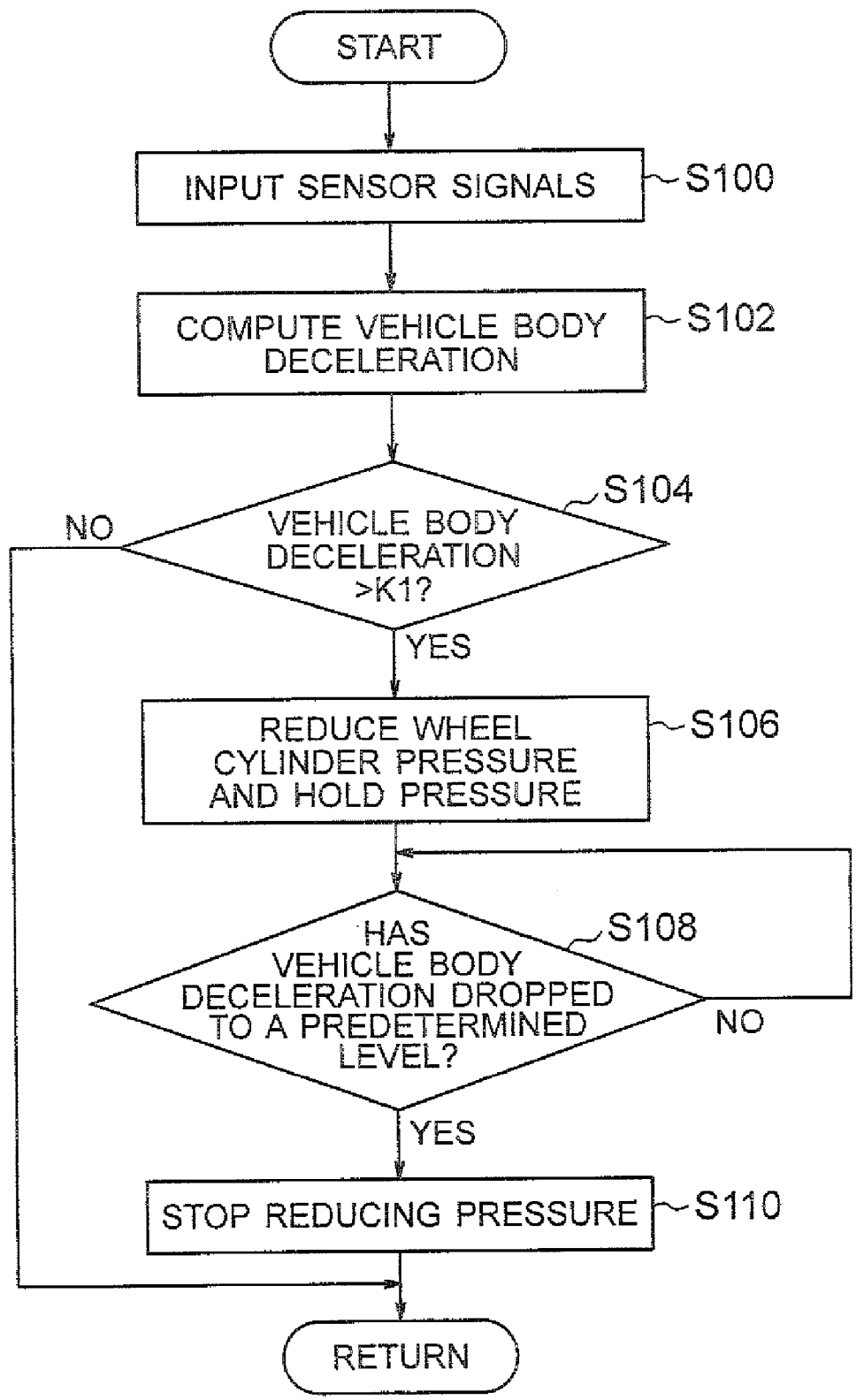
FIG. 2 is a sub-routine flowchart showing a first example of brake control processing that is executed by an electronic control unit that configures the brake control system shown in FIG. 1.
Figure 3A:
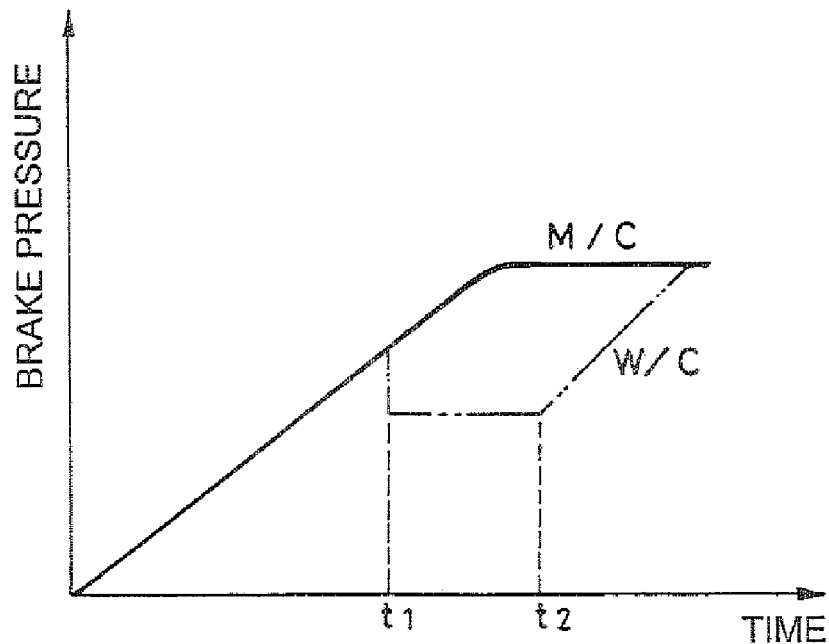
Figure 3B:
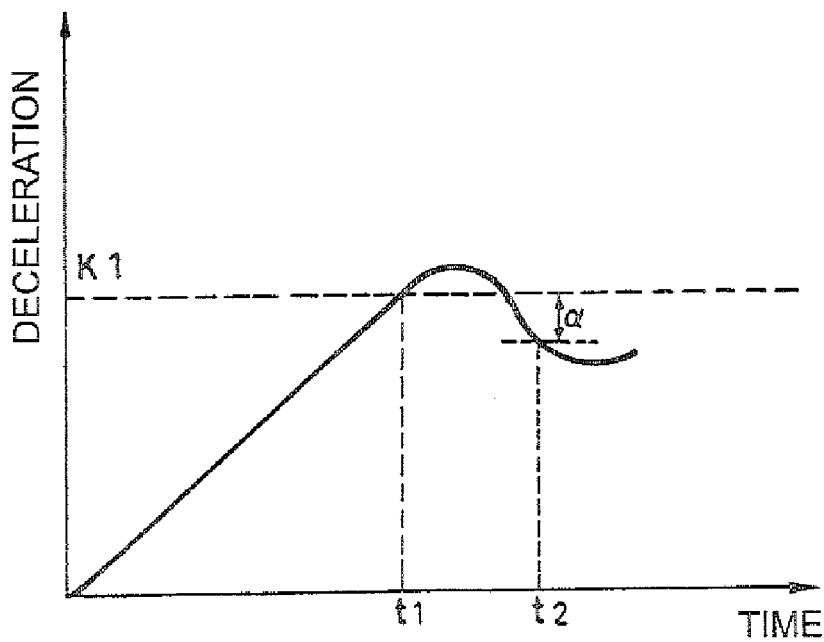
Figure 4:
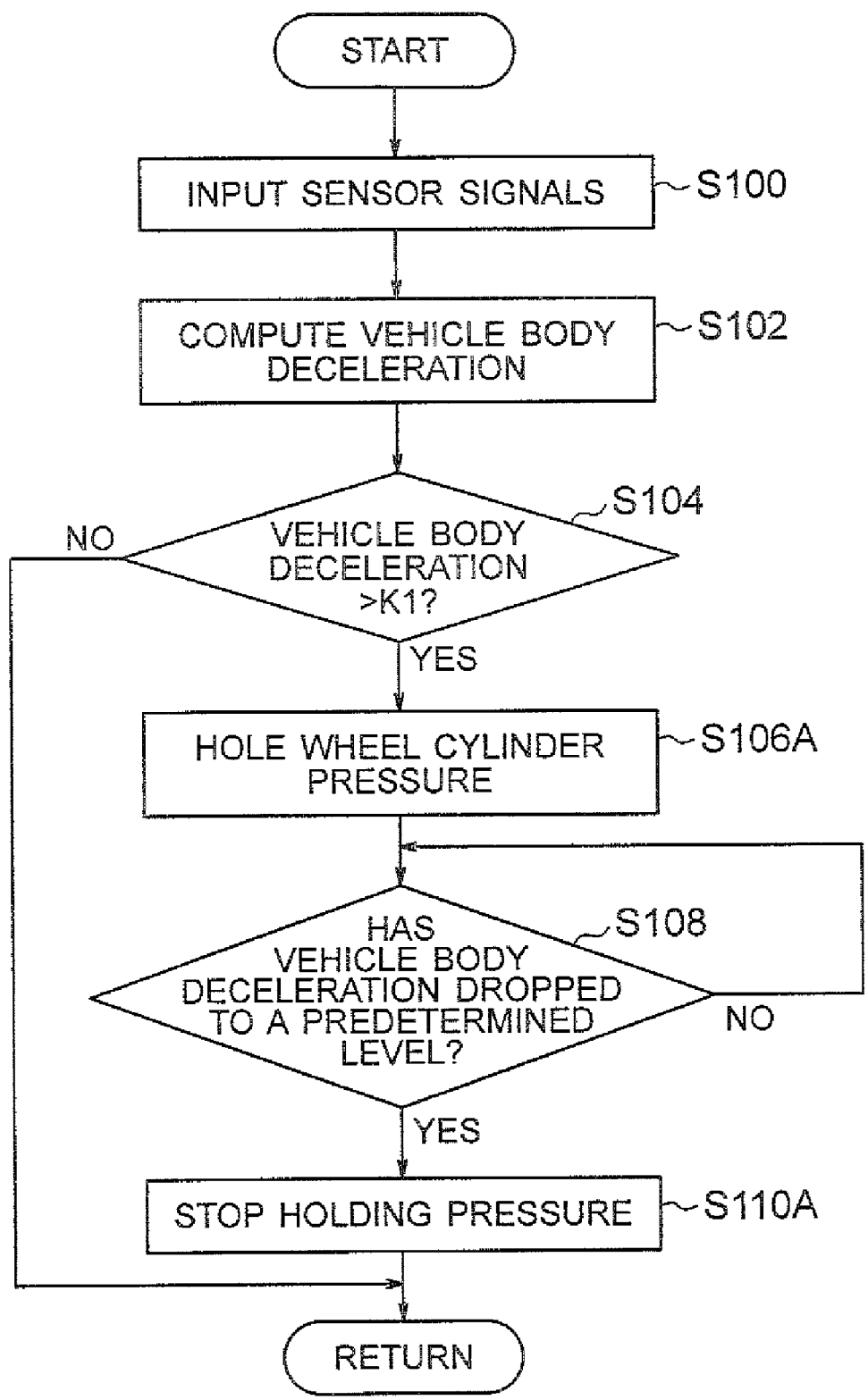
Figure 5A:
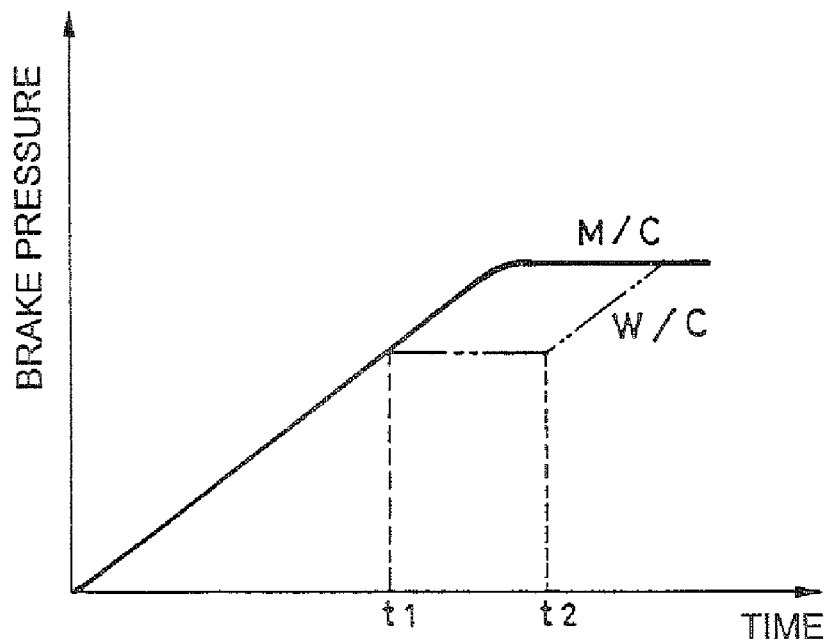
Figure 5B:
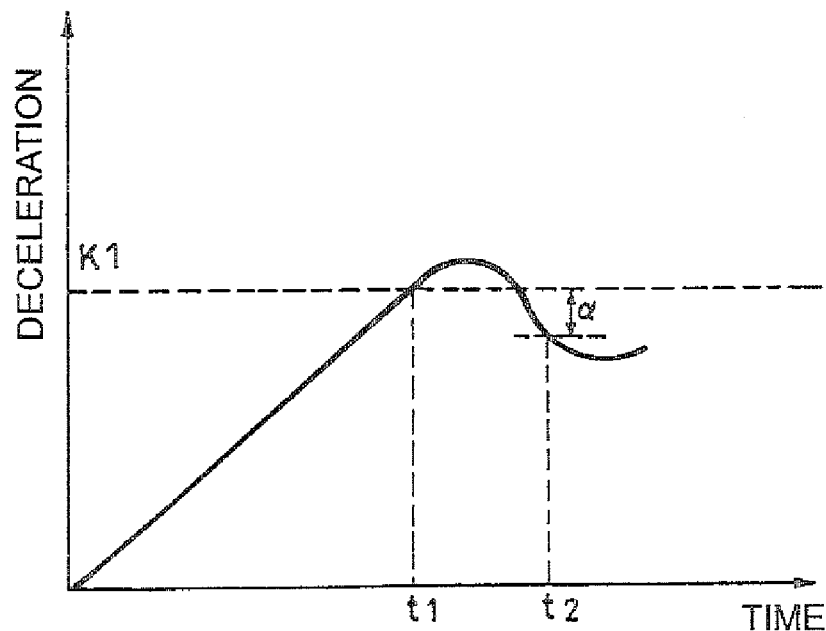
Figure 6:
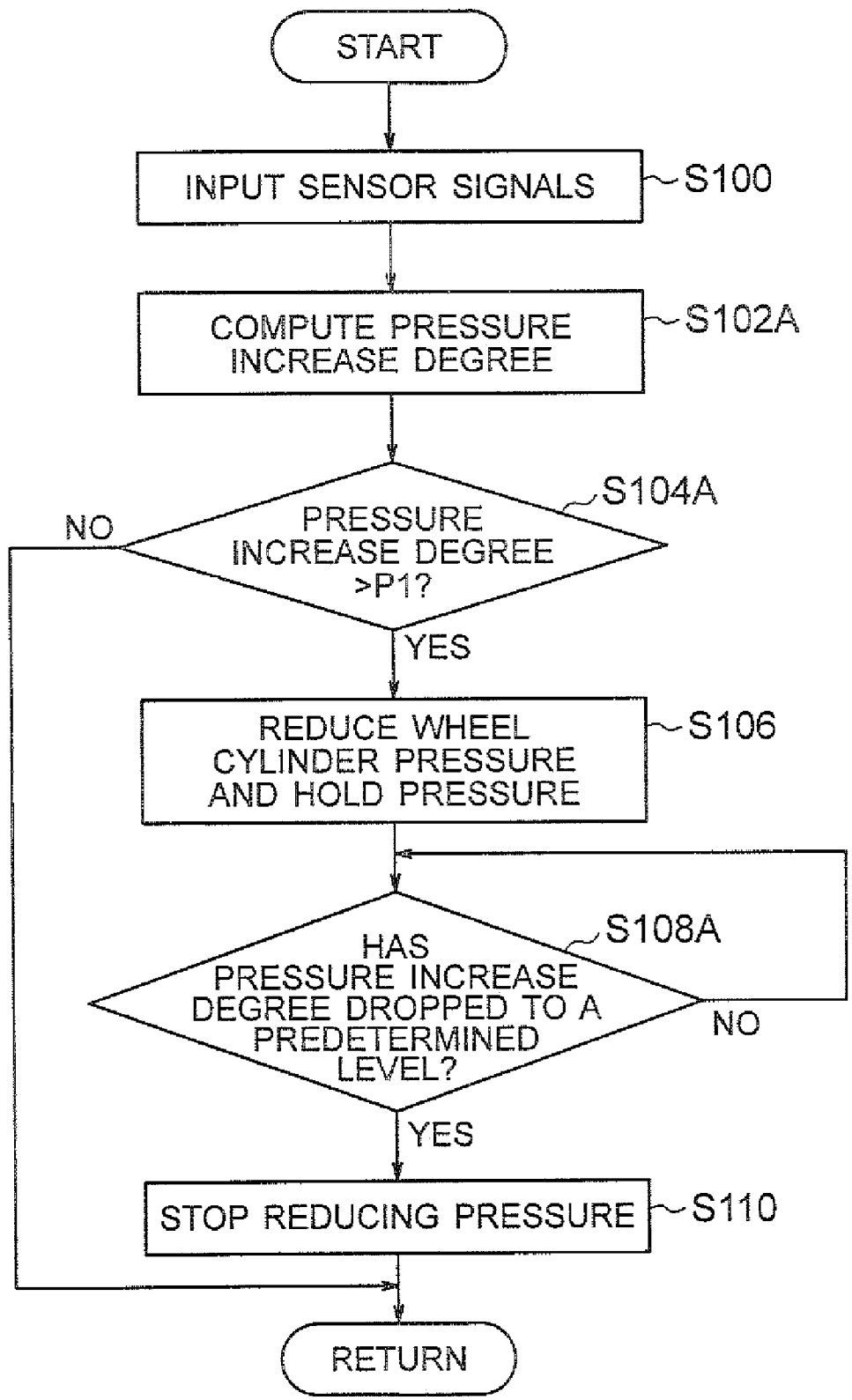

FIG. 3 is a general characteristic line diagrams for describing the relationship between vehicle body deceleration and brake pressure in the brake control shown in FIG. 2, with FIG. 3(A) being a characteristic line diagram generally showing an example of a change in brake pressure and FIG. 3(B) being a characteristic line diagram generally showing an example of a change in vehicle body deceleration when the change in brake in pressure shown in FIG. 3(A) occurs;

FIG. 4 is a sub-routine flowchart showing a second example of brake control processing that is executed by the electronic control unit that configures the brake control system shown in FIG. 1;

FIG. 5 is a general characteristic line diagrams for describing the relationship between vehicle body deceleration and brake pressure in the brake control shown in FIG. 4, with FIG. 5(A) being a characteristic line diagram generally showing an example of a change in brake pressure and FIG. 5(B) being a characteristic line diagram generally showing an example of a change in vehicle body deceleration when the change in brake pressure shown in FIG. 5(A) occurs; and FIG. 6 is a sub-routine flowchart showing a procedure of brake control processing when the magnitude of pressure increase of a front wheel cylinder is used as an index for judging whether or not there is the potential for rear wheel lifting.

DETAILED DESCRIPTION OF THE PREFERRED EMBODIMENTS

Below, an embodiment of the present invention will be described with reference to FIG. 1 to FIG. 6.

It will be noted that the members and arrangements described below are not intended to limit the invention and can be variously modified within the scope of the gist of the invention.

First, an example of the configuration of a two-wheeled motor vehicle brake control system in the embodiment of the invention will be described with reference to FIG. 1.

This brake control system S is broadly divided into a front brake master cylinder 1 that is disposed so as to be capable of converting the operational force of a brake handle 35 serving as a first brake operator into oil pressure, a rear brake master cylinder 2 that is disposed so as to be capable of converting the operational force of a brake pedal 36 serving as a second brake operator into oil pressure, a front wheel cylinder 3 that imparts brake force to a front wheel 37 in response to the oil pressure from the front brake master cylinder 1, a rear wheel cylinder 4 that imparts brake force to a rear wheel 38 in response to the oil pressure from the rear brake master cylinder 2, and an antilock brake control system 101 that is disposed between the front and rear brake master cylinders 1 and 2 and the front and rear wheel cylinders 3 and 4.

The front brake master cylinder 1 and the front wheel cylinder 3 are interconnected by a first main oil pressure tube 5, and a front main oil pressure tube-use throttle 6 and a first electromagnetic valve 7 that is ordinarily in an opened state are disposed in order from the front brake master cylinder 1 side midway along the first main oil pressure tube 5. Moreover, a front main oil pressure tube-use check valve 8 is disposed so as to bypass the front main oil pressure tube-use throttle 6 and the first electromagnetic valve 7 and in a direction where it deters the reverse flow of brake oil (brake fluid) from the front wheel cylinder 3 to the front brake master cylinder 1.

Similarly, the rear brake master cylinder 2 and the rear wheel cylinder 4 are interconnected by a second main oil pressure tube 9, and a rear main oil pressure tube-use throttle 10 and a second electromagnetic valve 11 that is ordinarily in an opened state are disposed in order from the rear brake master cylinder 2 side midway along the second main oil pressure tube 9. Moreover, a rear main oil pressure tube-use check valve 12 is disposed so as to bypass the rear main oil pressure tube-use throttle 10 and the second electromagnetic valve 11 and in a direction where it deters the reverse flow of brake oil from the rear wheel cylinder 4 to the rear brake master cylinder 2.

Further, a front reservoir connection-use oil pressure tube 13 is connected to an appropriate position of the first main oil pressure tube 5 between the first electromagnetic valve 7 and the front wheel cylinder 3, a front reservoir-use throttle 14 and a front reservoir inflow control-use electromagnetic valve 15 are disposed in order from the front wheel cylinder 3 side midway along the front reservoir connection-use oil pressure tube 13, and a front reservoir 16 is connected via these. Here, the front reservoir inflow control-use electromagnetic valve 15 is ordinarily in a closed state.

Moreover, a front return-use oil pressure tube 17 that is communicated with the front brake master cylinder 1 is connected to the front reservoir connection-use oil pressure tube 13 at an appropriate position between the front reservoir inflow control-use electromagnetic valve 15 and the front reservoir 16, and a front return path-use throttle 18, a first front return path-use check valve 19 and a second front return path-use check valve 20 are disposed in order from the front brake master cylinder 1 side midway along the front return-use oil pressure tube 17.

Further, basically similar to the configuration of the aforementioned first main oil pressure tube 5, a rear reservoir connection-use oil pressure tube 21 is connected to an appropriate position of the second main oil pressure tube 9 between the second electromagnetic valve 11 and the rear wheel cylinder 4, a rear reservoir-use throttle 22 and a rear reservoir inflow control-use electromagnetic valve 23 are disposed in order from the rear wheel cylinder 4 side midway along the rear reservoir connection-use oil pressure tube 21, and a rear reservoir 24 is connected via these. Here, the rear reservoir inflow control-use electromagnetic valve 23 is ordinarily in a closed state.

Moreover, a front return-use oil pressure tube 25 that is communicated with the rear brake master cylinder 2 is connected to the rear reservoir connection-use oil pressure tube 21 at an appropriate position between the rear reservoir inflow control-use electromagnetic valve 23 and the rear reservoir 24, and a rear return path-use throttle 26, a first rear return path-use check valve 27 and a second rear return path-use check valve 28 are disposed in order from the rear brake master cylinder 2 side midway along the rear return-use oil pressure tube 25.

Moreover, an oil pressure pump device 31 that is shared between the front brake and the rear brake is disposed in the antilock brake control system 101. That is, the oil pressure pump device 31 is generally configured by a motor 32 and two plungers 33a and 33b that are reciprocally moved by an unillustrated fixed cam that is fixedly attached to an output shaft (not shown) of the motor 32.

Additionally, the one plunger 33a is connected between the first front return path-use check valve 19 and the second front return path-use check valve 20, the other plunger 33b is connected between the first rear return path-use check valve 27 and the second rear return path-use check valve 28, the brake oil of the front reservoir 16 is sucked up and refluxed to the front brake master cylinder 1 and the brake oil of the rear reservoir 24 is sucked up and refluxed to the rear brake master cylinder 2 by the reciprocating motion of the plungers 33a and 33b.

Control of the operation of each of the first and second electromagnetic valves 7 and 11, the front reservoir inflow control-use electromagnetic valve 15, the rear reservoir inflow control-use electromagnetic valve 23 and the motor 32 is performed by an electronic control unit (notated as "ECU" in FIG. 1) 51.

The electronic control unit 51 is configured to be disposed with a microcomputer (not shown) that has a publicly known/commonly known configuration and memory elements (not shown) such as a RAM and a ROM.

The electronic control unit 51 executes various control programs for controlling the traveling of the vehicle that are stored in the unillustrated memory elements and performs various operation controls necessary for the driving and traveling of the vehicle. Examples of such operational controls of the vehicle include engine control, ABS control (Antilock Brake System), and processing to monitor the wheel velocities for determining whether or not there is an abnormality in wheel velocity sensors. Moreover, in the embodiment of the present invention, later-described brake control processing is executed.

In order to performed the aforementioned control processing, detection signals of wheel velocity sensors 45 and 46 that are correspondingly disposed in order to detect in the wheel velocities of the front wheel 37 and the rear wheel 38, a detection signal of a first pressure sensor 47 that detects the generated pressure of the front brake master cylinder 1, and a detection signal of a second pressure sensor 48 that detects the generated pressure of the front wheel cylinder 3 are inputted to the electronic control unit 51.

Moreover, detection signals of a brake lever actuation switch (not shown) that detects actuation of the brake handle 35 and a brake pedal actuation switch (not shown) that detects actuation of the brake pedal 36 are also inputted to the electronic control unit 51.

Further, a motor drive circuit 41 that generates and outputs a drive signal with respect to the motor 32 in response to a control signal from the electronic control unit 51 is disposed.

Moreover, an electromagnetic valve drive circuit 42 that controls the driving of the first and second electromagnetic valves 7 and 11, the front reservoir inflow control-use electromagnetic valve 15 and the rear reservoir inflow control-use electromagnetic valve 23 in response to control signals from the electronic control unit 51 is disposed. It will be noted that, in FIG. 1, the connections between the electromagnetic valve drive circuit 42 and the respective electromagnetic valves are omitted in order to simplify the drawing and make the drawing easier to understand.

It will be noted that the basic operation of the brake control system S of the aforementioned configuration is the same as that of this type of publicly known/commonly known brake control system, so detailed description here will be omitted, but the overall operation will be generally described.

For example, when the brake handle 35 is operated in order to cause the brake to act, a predetermined detection signal corresponding to the fact that that operation has been detected by the actuation switch (not shown) that detects operation of the brake handle 35 is inputted to the electronic control unit 51. At the same time, brake fluid of an oil pressure corresponding to operation of the brake handle 35 is supplied from the brake master cylinder 1 to the wheel cylinder 3, brake force is generated, and the brake force acts on the front wheel 37.

Then, in the electronic control unit 51, when it is judged that antilock brake control is necessary, the first electromagnetic valve 7 is excited, the first main oil pressure tube 5 is placed in a non-communicated state, and the oil pressure of the front wheel cylinder 3 is held at a constant. Then, in the electronic control unit 51, when it is judged that the brake should be eased, the front reservoir inflow control-use electromagnetic valve 15 is excited. As a result, the brake fluid of the front wheel cylinder 3 is discharged to the front reservoir 16 via the front reservoir inflow control-use electromagnetic valve 15, and the brake is eased.

At the same time, the motor 32 is driven by the electronic control unit 51 via the motor drive circuit 41, and the brake fluid stored in the front reservoir 16 is sucked up by the motion of the plunger 33a and refluxed to the front brake master cylinder 1.

It will be noted that when the brake pedal 36 is operated also, brake force with respect to the wheel 38 is obtained in basically the same manner as in the case of the brake handle 35 aforementioned, and alleviation of the brake force is performed, so description here will be omitted.

Next, brake control processing that is executed by the aforementioned electronic control unit 51 in this configuration will be described with reference to the flowchart shown in FIG. 2.

When processing is started, first, at least the detection signals (sensor signals) of the wheel velocity sensors 45 and 46 are inputted to the electronic control unit 51 and temporarily saved in an unillustrated predetermined memory region (refer to step S100 of FIG. 2). It will be noted that, in step S100, other sensor signals, that is, the detection signals of the pressure sensors 47 and 48 and the like, may also be inputted, and those input signals can be delivered when they are needed by other control processing outside of brake control processing.

Next, computation of vehicle body deceleration (deceleration of vehicle body velocity) is performed on the basis of the detection signals of the wheel velocity sensors 45 and 46 that have been inputted (refer to step S102 of FIG. 2). This vehicle body deceleration is calculated as an index for predicting the potential for lifting of the rear wheel resulting from sudden braking of the front wheel 37, and this vehicle body deceleration is determined as follows. That is, first, pseudo vehicle body velocities are calculated by a predetermined arithmetic expression on the basis of the wheel velocities that have been detected by the wheel velocity sensors 45 and 46. Additionally, vehicle body deceleration is determined as being equal to $(V1-V2)/\Delta t$ assuming that V1 represents a pseudo vehicle body velocity at a given time t1 and that V2 represents a pseudo vehicle body velocity at a time t2 after the elapse of a minute amount of time $\Delta t$ from time t1. It will be noted that, in the following description, "deceleration" means vehicle body deceleration.

Next, it is determined whether or not the vehicle body deceleration that has been calculated as mentioned above exceeds a predetermined value K1 (refer to step S104 of FIG. 2), and when it is determined that the vehicle body deceleration does not exceed the predetermined value K1 (in the case of NO), then the series of processing is ended and the sub-routine returns to an unillustrated main routine. On the other hand, in step S104, when it is determined that the vehicle body deceleration exceeds the predetermined value K1 (in the case of YES), then it is determined that there is a large potential for rear wheel lifting, the sub-routine moves to the processing of the next step S106, and forced pressure reduction and holding of the pressure of the front wheel cylinder 3 are performed.

That is, predetermined signals for placing the first electromagnetic valve 7 in a closed state and for placing the front reservoir inflow control-use electromagnetic valve 15 in an opened state are outputted from the electronic control unit 51 to the electromagnetic valve drive circuit 42, and the first electromagnetic valve 7 is placed in a closed state and the front reservoir inflow control-use electromagnetic valve 15 is placed in an opened state. Thus, communication between the front brake master cylinder 1 and the front wheel cylinder 3 is cut off, the brake fluid of the front wheel cylinder 3 is discharged to the front reservoir 16, and pressure reduction of the front wheel cylinder 3 is performed. It is suitable for this pressure reduction of the front wheel cylinder 3 to be pressure reduction of a predetermined amount on the basis of the detection result of the second pressure sensor 48, for example. Additionally, in this case, determination of whether or not pressure reduction of a predetermined value has been performed on the basis of the detection result of the second pressure sensor 48 is performed, and when it is determined that pressure reduction of a predetermined pressure has been performed, then the front reservoir inflow control-use electromagnetic valve 15 is placed in a closed state, the front wheel cylinder 3 and the front reservoir 16 are placed in a non-communicated state, and the front wheel cylinder 3 is held at that pressure that has been reduced.

In FIG. 3(A) and FIG. 3(B), there are shown characteristic line diagrams generally showing a change in brake pressure and a change in vehicle body deceleration in the aforementioned brake control, and the same drawings will be described below.

In FIG. 3(A), as a change in brake pressure, the pressure of the front brake master cylinder 1 and the front wheel cylinder 3 are substantially the same until time t1 when pressure reduction of the front wheel cylinder 3 is performed, and that change in pressure is appropriately represented by a solid line, and the change in the pressure of the front wheel cylinder 3 from time t1 on is represented by a two-dotted chain line.

In FIG. 3(A), there is shown by a solid line an example of a state where a sudden brake operation of the brake handle 35 is performed and brake pressure, that is, the pressures of the front brake master cylinder 1 and the front wheel cylinder 3, increases substantially linearly as time elapses until time t1, and just the front brake master cylinder 1 still increases pressure from time t1 on until it finally reaches a maximum pressure.

On the other hand, a state where pressure reduction of a predetermined amount in the front wheel cylinder 3 is performed at time t1 and brake pressure drops by a predetermined pressure in response thereto and next is held at that dropped brake pressure is shown by a two-dotted chain line in FIG. 3(A).

Further, FIG. 3(B) is an example of a change in vehicle body deceleration, and in this example, there is shown a state where vehicle body deceleration also increases together with the increase in brake pressure shown in FIG. 3(A), exceeds the predetermined value K1 at time t1, thereafter increases somewhat by the pressure reduction of the front wheel cylinder 3 that has been mentioned before, changes to a decrease, and then falls below the predetermined value K1.

Because of this pressure reduction of a predetermined amount in the front wheel cylinder 3 and holding of the pressure thereafter, vehicle body deceleration changes to a decrease about when it somewhat exceeds the predetermined value K1 (refer to FIG. 3(B)).

Here, returning again to the description of FIG. 2, the processing of step S106 is executed as mentioned above, and thereafter it is determined whether or not vehicle body deceleration has dropped to a predetermined level (refer to step S108 of FIG. 2).

Here, in the embodiment of the present invention, as the predetermined level for judging a drop in vehicle body deceleration, not just the previous predetermined value K1 at the time of the rise in the amount of change, but a level (K1−α) equal to a predetermined amount a subtracted from the predetermined value K1 is used as a judgment criterion, and a so-called hysteresis is disposed between the judgment level at the time of a rise in vehicle body deceleration and the judgment level at the time of a decrease.

Consequently, in step S108, when it is determined that vehicle body deceleration has fallen below the predetermined level (K1−α) (refer to the point in time of time t2 of FIG. 3(B)), the sub-routine proceeds to the processing of step S110, and forced pressure reduction of the front wheel cylinder 3 is stopped. That is, the first electromagnetic valve 7 is placed in an opened state by the electronic control unit 51 via the electromagnetic valve drive circuit 42, and the front brake master cylinder 1 and the front wheel cylinder 3 return to a communicated state. For that reason, the pressure of the front brake master cylinder 1 is transmitted to the front wheel cylinder 3, so the brake pressure resulting from the front wheel cylinder 3 rises (refer to time t2 on of FIG. 3(A)).

It will be noted that the sub-routine returns to the unillustrated main routine after the processing of step S110. Then, normal brake control is performed.

Next, a second example of brake control processing will be described with reference to FIG. 4 and FIG. 5.

It will be noted that, in the sub-routine flowchart shown in FIG. 4, the same step numbers will be given to steps having the same processing content as those in the sub-routine flowchart shown in FIG. 2, detailed description of those steps having the same processing content will be omitted, and the points that are different will be mainly described below.

Further, FIG. 5(A) and FIG. 5(B) correspond to FIG. 3(A) and FIG. 3(B), respectively, and as will be described below, just the way of a change in brake pressure resulting from a difference in pressure control of the front wheel cylinder 3 is different, and the remaining portions are basically the same as those shown in FIG. 3(A) and FIG. 3(B).

To describe this specifically below, in this second brake control processing, in step S104, when it is determined that vehicle body deceleration exceeds the predetermined value K1 (in the case of YES), then the sub-routine proceeds to the processing of the next step S106A, and holding of the pressure of the front wheel cylinder 3 is performed. That is, a predetermined signal for placing the first electromagnetic valve 7 in a closed state is outputted from the electronic control unit 51 to the electromagnetic valve drive circuit 42, the first electromagnetic valve 7 is placed in a closed state, and communication between the front brake master cylinder 1 and the front wheel cylinder 3 is cut off. For that reason, the pressure of the front wheel cylinder 3 is held at the pressure at that point in time (refer to the point in time of time t1 of FIG. 5(A) and FIG. 5(B)).

Then, after the processing of step S106A, it is determined whether or not vehicle body deceleration has fallen below the predetermined level (K1−α) (refer to step S108 of FIG. 4), and when it is determined that vehicle body deceleration has fallen below the predetermined level (K1−α) (refer to the point in time of time t2 of FIG. 5(B)), then the sub-routine proceeds to the processing of step S110A, and holding of the pressure of the front wheel cylinder 3 is released. That is, the first electromagnetic valve 7 is placed in an opened state by the electronic control unit 51 via the electromagnetic valve drive circuit 42, and the front brake master cylinder 1 and the front wheel cylinder 3 return to a communicated state. For that reason, the pressure of the front brake master cylinder 1 is transmitted to the front wheel cylinder 3, and the brake pressure resulting from the front wheel cylinder 3 rises (refer to time t2 on of FIG. 5(A)).

Then, after the processing of step S110A, the sub-routine returns to the unillustrated main routine and normal brake control is performed.

In the preceding embodiment, the brake control system was configured to determine whether or not there is the potential for rear wheel lifting by the magnitude of vehicle body deceleration, but the brake control system may also use the magnitude of the pressure increase degree of the front wheel cylinder 3, or in other words, the amount of change in brake force, as a judgment index instead of vehicle body deceleration.

In FIG. 6, there is shown a sub-routine flowchart showing a procedure of brake control processing when the magnitude of the pressure increase degree of the front wheel cylinder 3 is used as an index for judging whether or not there is the potential for rear wheel lifting, and this control processing will be described below with reference to the drawing.

It will be noted that the same step numbers will be given to steps having the same processing content as those in the sub-routine flowchart shown in FIG. 2, detailed description of those steps having the same processing content will be omitted, and the points that are different will be mainly described below.

First, in step S100, it is necessary for at least the detection signal of the second pressure sensor 48 to be inputted.

Then, in step S102A, the pressure increase degree of the front wheel cylinder 3 is computed and calculated on the basis of the detection signal of the second pressure sensor 48.

Here, the pressure increase degree is determined as $\{p(t0+\Delta t)-p(t0)\}/\Delta t$ assuming that $p(t0)$ represents the pressure of the front wheel cylinder 3 at a given time t0 and that $p(t0+\Delta t)$ represents the pressure of the front wheel cylinder 3 at a point in time after the elapse of a minute amount of time $\Delta t$ from there.

Next, it is determined whether or not the pressure increase degree that has been calculated as described above exceeds a predetermined value P1 (refer to step S104A of FIG. 6), and when it is determined that the pressure increase degree does not exceed the predetermined value P1 (in the case of NO), then the series of processing is ended and the sub-routine returns to the unillustrated main routine. On the other hand, in step S104A, when it is determined that the pressure increase degree exceeds the predetermined value P1 (in the case of YES), then it is determined that there is a large potential for rear wheel lifting, the sub-routine proceeds to the next step S106, and forced pressure reduction and holding of the pressure of the front wheel cylinder 3 are performed.

Next, it is determined whether or not the pressure increase degree has dropped to a predetermined level (refer to step S108A of FIG. 6). It will be noted that, similar to what has been previously described in the processing of step S108 of FIG. 2, it is suitable for the determination level of the drop of the pressure increase degree to include a so-called hysteresis characteristic as a pressure increase degree (P1–β) that is lower by a predetermined value β with respect to the aforementioned predetermined value P1.

Then, when it is determined that the pressure increase degree has fallen below the predetermined level, pressure reduction stop processing is performed (refer to step S110 of FIG. 6).

It will be noted that the fact that, instead of pressure reduction of a predetermined pressure of the front wheel cylinder 3 in step S106, when it is determined that the pressure increase degree exceeds the predetermined value P1, the brake control system may also be configured to hold the pressure at the pressure of the front wheel cylinder 3 at that time is the same as the example described in FIG. 4, so detailed description using a drawing corresponding to FIG. 4 will be omitted here.

The present invention can be applied to a two-wheeled motor vehicle of which the demand for safety is high because of quick and accurate control of lifting of a rear wheel resulting from predicting lifting of the rear wheel by the value of a predetermined parameter and performing control of brake force in response to that prediction result.

According to the present invention, the invention is configured to predict the potential for lifting of the rear wheel before lifting of the rear wheel actually occurs and to control brake force in response thereto, whereby the invention provides the effects that, contrary to what has conventionally been the case where control of brake force has been performed in response to actual lifting of the rear wheel, brake control that can control the rear wheel lifting quickly and accurately and shorten brake distance can be realized, and therefore a vehicle whose safety in and reliability are higher in comparison to what has conventionally been the case can be provided.

What is claimed is:

1. A two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, and capable of discharging brake fluid of the front wheel cylinder to a front reservoir as desired, wherein the brake control system is configured to determine whether or not the value of a predetermined parameter that has been preselected as an index for predicting the potential for lifting of a rear wheel exceeds a first predetermined value, determine that the potential for lifting of the rear wheel is large when the value of the predetermined parameter exceeds the first predetermined value and control generation of brake force by the front wheel cylinder, and next determine whether or not the value of the predetermined parameter has fallen below a second predetermined value and, when it is determined that the predetermined parameter has fallen below said second predetermined value, release the control of the brake force, wherein the second predetermined value is a value that is lower than the first predetermined value by a predetermined value, wherein the control of the brake force is performed by reducing, by a predetermined pressure, the pressure of the front wheel cylinder and holding the pressure of the wheel cylinder at that reduced pressure, and wherein the predetermined parameter is an amount of change in the pressure of the front wheel cylinder.

2. The two-wheeled motor vehicle brake control system of claim 1, wherein the control of the brake force is performed by holding the pressure of the front wheel cylinder at the pressure when it is determined that the predetermined parameter exceeds the first predetermined value.

3. A two-wheeled motor vehicle brake control program that is executed in a two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, and capable of discharging brake fluid of the front wheel cylinder to a front reservoir as desired, wherein the brake control program includes a first step of determining whether or not the value of a predetermined parameter that has been preselected as an index for predicting the potential for lifting of a rear wheel exceeds a first predetermined value, a second step of determining that the potential lifting of the rear wheel is large when the value of the predetermined parameter exceeds the first predetermined value at the first step, causing brake fluid to be discharged to the front reservoir such that the pressure of the front wheel cylinder is reduced by a predetermined pressure and, when the pressure of the front wheel cylinder has been reduced by a predetermined pressure, causing the pressure of the front wheel cylinder to be held at that pressure, a third step of determining whether or not the value of the predetermined parameter has fallen below a value that is lower by a predetermined value than the first predetermined value, and a fourth step of releasing holding of the pressure of the front wheel cylinder when it is determined in the third step that the predetermined parameter has fallen below the value that is lower by a predetermined value than the first predetermined value, wherein the predetermined parameter is an amount of change in the pressure of the wheel cylinder that applies brake force to the front wheel.

4. A two-wheeled motor vehicle brake control program that is executed in a two-wheeled motor vehicle brake control system configured to be capable of transmitting oil pressure arising in a front brake master cylinder in response to operation of a first brake operator to a front wheel cylinder via an oil pressure system, capable of transmitting oil pressure arising in a rear brake master cylinder in response to operation of a second brake operator to a rear wheel cylinder via an oil pressure system, and capable of discharging brake fluid of the front wheel cylinder to a front reservoir as desired, wherein the brake control program includes
a first step of determining whether or not the value of a predetermined parameter that has been preselected as an index for predicting the potential for lifting of a rear wheel exceeds a first predetermined value, a second step of determining that the potential lifting of the rear wheel is large when the value of the predetermined parameter exceeds the first predetermined value at the first step, causing the pressure of the front wheel cylinder to be held at the pressure at that time, a third step of determining whether or not the value of the predetermined parameter has fallen below a value that is lower by a predetermined value than the first predetermined value, and a fourth step of releasing holding of the pressure of the front wheel cylinder when it is determined in the third step that the predetermined parameter has fallen below the value that is lower by a predetermined value than the first predetermined value, wherein the predetermined parameter is an amount of change in the pressure of the wheel cylinder that applies brake force to the front wheel.

5. A two-wheeled motor vehicle brake control method comprising:

determining whether or not the value of one kind of parameter selected beforehand as an index for predicting the potential for lifting of a rear wheel exceeds a first predetermined value;

determining that the potential for lifting of the rear wheel is large when the value of the one kind of parameter selected beforehand exceeds the first predetermined value and controlling generation of brake force;

next determining whether or not the value of the one kind of parameter selected beforehand has fallen below a second predetermined value and, when it is determined that the one kind of parameter selected beforehand has fallen below the second predetermined value, releasing the control of the brake force;

wherein the second predetermined value is a value that is lower than the first predetermined value by a predetermined value;

wherein the control of the brake force is performed by holding the pressure of a wheel cylinder that applies brake force to a front wheel at the pressure when it is determined that the one kind of parameter selected beforehand exceeds the first predetermined value;

wherein the one kind of parameter selected beforehand is an amount of change in the pressure of the wheel cylinder that applies brake force to the front wheel; and wherein the amount of change in the pressure of the wheel cylinder that applies brake force to the front wheel is the only parameter used in the brake control method.

6. A two-wheeled motor vehicle brake control method comprising:

determining whether or not the value of one kind of parameter selected beforehand as an index for predicting the potential for lifting of a rear wheel exceeds a first predetermined value;

determining that the potential for lifting of the rear wheel is large when the value of the one kind of parameter selected beforehand exceeds the first predetermined value and controlling generation of brake force;

next determining whether or not the value of the one kind of parameter selected beforehand has fallen below a second predetermined value and, when it is determined that the one kind of parameter selected beforehand has fallen below the second predetermined value, releasing the control of the brake force;

wherein the second predetermined value is a value that is lower than the first predetermined value by a predetermined value;

wherein the control of the brake force is performed by reducing, by a predetermined pressure, the pressure of a wheel cylinder that applies brake force to a front wheel and holding the pressure of the wheel cylinder at that reduced pressure;

wherein the one kind of parameter selected beforehand is an amount of change in the pressure of the wheel cylinder that applies brake force to the front wheel; and wherein the amount of change in the pressure of the wheel cylinder that applies brake force to the front wheel is the only parameter used in the brake control method.

7. A two-wheeled motor vehicle brake control method comprising:

determining whether or not the value of one kind of parameter selected beforehand as an index for predicting the potential for lifting of a rear wheel exceeds a first predetermined value;

determining that the potential for lifting of the rear wheel is large when the value of the one kind of parameter selected beforehand exceeds the first predetermined value and controlling generation of brake force;

next determining whether or not the value of the one kind of parameter selected beforehand has fallen below a second predetermined value and, when it is determined that the one kind of parameter selected beforehand has fallen below the second predetermined value, releasing the control of the brake force;

wherein the second predetermined value is a value that is lower than the first predetermined value by a predetermined value;

wherein the control of the brake force is performed by holding the pressure of a wheel cylinder that applies brake force to a front wheel at the pressure when it is determined that the one kind of parameter selected beforehand exceeds the first predetermined value;

wherein the one kind of parameter selected beforehand is an amount of change in the pressure of the wheel cylinder that applies brake force to the front wheel; and wherein the amount of change in the pressure of the wheel cylinder that applies brake force to the front wheel is the only parameter used in the brake control method.

* * * * *

UNITED STATES PATENT AND TRADEMARK OFFICE
CERTIFICATE OF CORRECTION

PATENT NO.        : 8,070,237 B2
APPLICATION NO.   : 12/161367
DATED             : December 6, 2011
INVENTOR(S)       : Takahiro Ogawa, Helge Westerfeld and Markus Hamm It is certified that error appears in the above-identified patent and that said Letters Patent is hereby corrected as shown below:

Page 13, Column 12, Lines 35-64: Remove duplicate claim 7.

Signed and Sealed this
Twenty-fifth Day of September, 2012

David J. Kappos
*Director of the United States Patent and Trademark Office*